United States Patent [19]

Jursa

[11] 4,406,685
[45] Sep. 27, 1983

[54] ECCENTRICALLY MOUNTED STOP FOR OUTLINE MOLDS FOR SHAPING GLASS SHEETS

[75] Inventor: Stephen J. D. Jursa, Saxonburg, Pa.

[73] Assignee: PPG Industries, Inc., Pittsburgh, Pa.

[21] Appl. No.: 355,941

[22] Filed: Mar. 8, 1982

[51] Int. Cl.³ ............................................ C03B 23/023
[52] U.S. Cl. ........................................ 65/287; 65/289; 65/290
[58] Field of Search .................. 65/289, 287, 290, 291

[56] References Cited

U.S. PATENT DOCUMENTS

| | | | |
|---|---|---|---|
| 2,111,392 | 3/1938 | Galey | 49/67 |
| 2,261,023 | 10/1941 | Galey | 49/67 |
| 2,297,315 | 9/1942 | Owen | 49/67 |
| 2,330,349 | 9/1943 | Galey | 49/67 |
| 2,518,951 | 8/1950 | Smith | 49/67 |
| 2,551,607 | 5/1951 | Jendrisak | 49/67 |
| 2,695,476 | 11/1954 | Jendrisak | 49/67 |
| 2,729,032 | 1/1956 | White | 49/67 |
| 2,736,140 | 2/1956 | Black | 49/67 |
| 2,744,359 | 5/1956 | Jendrisak | 49/67 |
| 2,758,422 | 8/1956 | Jendrisak | 49/67 |
| 2,774,189 | 12/1956 | Jendrisak | 49/67 |
| 2,798,338 | 7/1957 | Jendrisak | 49/67 |
| 2,814,164 | 11/1957 | Carson et al. | 49/67 |
| 2,840,953 | 7/1958 | Black | 49/67 |
| 2,859,561 | 11/1958 | Jendrisak | 49/67 |
| 2,901,866 | 9/1959 | McKelvey et al. | 49/84 |
| 2,953,871 | 9/1960 | Peck | 65/291 |
| 3,005,290 | 10/1961 | Richardson | 65/290 |
| 3,023,542 | 3/1962 | Babcock | 49/67 |
| 3,060,708 | 10/1962 | Stickel | 65/291 |
| 3,089,319 | 5/1963 | Carson et al. | 65/288 |
| 3,103,430 | 9/1963 | Jendrisak | 65/290 |
| 3,162,523 | 12/1964 | McKelvey et al. | 65/289 |
| 3,220,822 | 11/1965 | Jendrisak | 65/291 |
| 3,230,067 | 1/1966 | Carson et al. | 65/290 |
| 3,408,173 | 10/1968 | Leflet, Jr. | 65/287 X |
| 4,272,275 | 6/1981 | Reese | 65/273 |

Primary Examiner—Arthur D. Kellogg
Attorney, Agent, or Firm—William D. West; Edward I. Mates

[57] ABSTRACT

This invention relates to a stop adapted for attachment to outline molds of different outline configurations defining shapes of different depths of bend desired for glass sheets to be shaped to different patterns. The stop comprises a glass engaging member of disc-like configuration having a front surface oriented to face an edge surface of a glass sheet to be mounted in engaging relation to said front surface when loaded onto a selected one of said outline molds. The glass engaging member of disc-like configuration is supported in eccentric relation to a rod supported in fixed relation relative to a localized portion of an upwardly facing shaping surface defined by a shaping rail of said selected outline mold. When the glass engaging member of disc-like configuration is rotated about an axis defined by the rod, the vertical dimension of the glass engaging member of disc-like configuration above the rod is changed to correlate with the height of stop needed to engage an edge of the glass sheet to be bent to a shape conforming to that developed by the outline mold.

The present invention makes it possible to provide an inventory of identical stops for many different production patterns to be fabricated. In addition, a simple rotational adjustment often enables a stop to be continued in use rather than requiring replacement under certain circumstances when the stop becomes damaged during use.

6 Claims, 3 Drawing Figures

ECCENTRICALLY MOUNTED STOP FOR OUTLINE MOLDS FOR SHAPING GLASS SHEETS

BACKGROUND OF THE INVENTION

1. Field of the Invention

This invention relates to the shaping of glass sheets, particularly those of non-rectangular outline, to conform to the shape of bending molds having one or more shaping rails of outline configuration conforming to the shape desired for glass sheets to be bent. In the loading of such molds, it is important that glass sheets, particularly those of nonrectangular outline, be aligned precisely with respect to the outline of the mold shaping surface to which the glass is to conform. Accordingly, in the past, stops have been provided in close proximity to the outline shaping surface of the mold to assist in the proper alignment of glass sheets relative to the upwardly facing shaping surface of the outline mold. Under such circumstances each mold of a particular pattern was provided with a stop arranged and constructed in a manner unique for that particular pattern.

It would be beneficial to the glass sheet bending art to develop universal stops capable of use with molds of different peripheral outlines used to bend glass sheets of different outlines to different configurations and depth of bend required for different production patterns. Under such circumstances, the complicated storage and inventory problem required to maintain a separate supply of replacement stops for each pattern of molds would be eliminated.

2. Description of Patents of Interest

Stops have been used in many arrangements relative to glass sheet shaping apparatus. The patents described hereinafter represent many uses of glass edge alignment stops on glass sheet shaping molds.

U.S. Pat. Nos. 2,111,392 and 2,261,023 to Galey and 2,297,315 to Owen disclose stops that are fixed in position relative to a glass sheet bending mold to fix the position of a flat glass sheet when mounted for bending.

U.S. Pat. No. 2,330,349 to Galey provides stops fixed to the opposite ends of a sectionalized mold to guide the original positioning of a flat glass sheet onto the mold for bending. The stops continue to engage the ends of the glass sheet as the mold closes to help shape the glass sheet to the shaping surface defined by the mold.

U.S. Pat. No. 2,518,951 to Smith discloses stop members in the form of loosely supported blocks of asbestos or the like that are less harmful to glass sheet edges than the metal outline molds to which they are attached.

U.S. Pat. No. 2,551,607 to Jendrisak discloses stops comprising a ceramic roller rotatable on a frame that is pivotally attached to an outline mold for shaping glass sheets. The pivotable frame is spring loaded and means is provided to tension the spring so as to control the bias of the stops against the opposite ends of a glass sheet mounted on the outline mold for shaping.

U.S. Pat. No. 2,736,140 to Black discloses glass edge engaging members 360 that are provided with a bracket 361 rigidly mounted upon a shaping rail 325. A screw bolt 362 is threaded through the bracket plate 361. A small plate or disc is mounted on the inner end of the screw bolt 362 for slight pivotal movement in order that the disc may conform to the edge of the glass sheet when the latter is mounted on the shaping rail. The adjustment of the screw bolt 362 relative to the bracket 361 determines the location of the glass edge engaging surface of the disc relative to the shaping rail. There is no indication that the disc is mounted to the screw bolt in any other arrangement than concentric thereto.

U.S. Pat. No. 2,695,476 to Jendrisak and U.S. Pat. No. 2,729,032 to White disclose outline molds that have glass edge engaging members that pivot inward to follow the edges of the glass sheet as it sags toward the outline mold. The glass edge engaging members must be removed manually to remove the bent glass sheet from the mold. Other patents showing this feature include U.S. Pat. Nos. 2,744,359; 2,758,422; 2,774,189; 2,798,338 and 2,859,561, all to Jendrisak.

U.S. Pat. Nos. 2,814,164 and 3,089,319 to Carson and White disclose outline molds having universally pivotable stops that follow and engage pointed tips at the opposite longitudinal edges of glass sheets supported for bending on the outline mold to control tip overbending as well as positioning.

U.S. Pat. No 2,840,953 to Black and U.S. Pat. No. 3,023,542 to Babcock disclose bimetal actuators attached to glass edge guide members to change the location of the guide members in response to a change in temperature during the bending cycle. When the mold is cool, the bimetal actuators position the edge guides into proper positions for aligning a glass sheet edge. When the mold is heated to heat soften the glass, the bimetal actuators move the edge guide members relative to the engaged glass edge, thus either losing the contact between the guide members and the glass sheet edge that maintains the glass in proper mold alignment or forcing the glass into more intimate mold contact as the assembly is heated.

U.S. Pat. Nos. 2,901,866 and 3,162,523 to McKelvey and U.S. Pat. No. 3,103,430 to Jendrisak disclose outline molds with counterweighted, pivoted glass engaging members that pivot against the glass sheet edge as the glass sags toward the shaping surface of the outline mold. No provision is made to disengage the glass edge after the glass bend is completed except for manual operation.

U.S. Pat. No. 3,060,708 to Stickel discloses a sectionalized mold having glass edge engaging members mounted to move away from the glass edge as the mold sections close to provide a substantially continuous outline shaping surface. The alignment is lost as soon as the engagement members disengage from the glass edge.

U.S. Pat. No. 3,220,822 to Jendrisak discloses sectionalized outline molds having a pivoted end portion for each end mold section that follow the ends of the glass sheet as the latter shortens from a flat shape to a shape curved in elevation. Manual operation is also required here to separate the end portions from the bent glass sheet.

U.S. Pat. No. 3,230,067 to Carson and Stickel discloses an outline sectionalized shaping mold comprising pivotally supported shaped members that serve as both edge guides and supports for the flat glass sheet that rotate outwardly from the guided side edges as the mold closes and the glass sheet sags to shape. Disengagement of the glass edge as the glass sheet sags permits the likelihood of glass sheet misalignment during shaping.

U.S. Pat. No. 4,272,275 to Reese is concerned with glass edge alignment members that are supported in positions to engage the edge of one or more glass sheets mounted on an outline mold for sag bending during a sag bending step and are released from said supported positions suddenly and automatically just prior to removing the sag bent glass from said outline mold. The glass edge alignment members after said release are supported relative to said outline mold in positions remote from said glass edge to avoid rubbing the glass edge thereagainst during removal of the bent glass from the outline mold.

None of the patents discussed previously provide solutions to the problems of inventory storage and application of one stop construction for molds providing different patterns.

SUMMARY OF THE INVENTION

This invention relates to a stop adapted for attachment to outline molds of different outline configurations defining shapes of different depths of bend desired for glass sheets to be shaped to different patterns. The stop comprises a glass engaging member of disc-like configuration having a front surface oriented to face an edge surface of a glass sheet to be mounted in engaging relation to said front surface when loaded onto a selected one of said outline molds for bending. A rod extends from the glass engaging member of disc-like configuration. Means mounts the glass engaging member of disc-like configuration to the rod in eccentric relation thereto. The rod is supported in fixed relation relative to a localized portion of an upwardly facing shaping surface defined by a shaping rail of said selected outline mold. When the glass engaging member of disc-like configuration is rotated about an axis defined by the rod, the vertical dimension of the glass engaging member of disc-like configuration above the rod is changed to correlate with the height of stop needed to engage an edge of a flat glass sheet to be bent to a shape conforming to that developed by the outline mold.

The present invention makes it possible to provide a single inventory of identical stops for many different production patterns to be fabricated. In addition, a simple adjustment enables a stop to be continued in use rather than requiring replacement in the event the stop becomes damaged during use.

The preferred composition for the front surface of the glass engaging member of disc-like configuration is a phenolic resin reinforced with an aromatic polyamide fiber when the stop is used with an outline mold to transfer a glass sheet from a shaping station to a cooling station. Such outline molds are used in U.S. Pat. Nos. 3,846,104 and 4,280,828 to Seymour, and 4,274,274 to Frank et al. The composition of the glass engaging member is preferably a ceramic composition such as aluminum silicate or magnesium calcium silicate when the glass edge engaging member is used with a mold that carries one or more glass sheets through a bending furnace as well as a cooling area, such as in U.S. Pat. No. 2,736,140 to Black.

The benefits of the present invention will be understood more clearly in the light of a description of a specific embodiment that follows.

BRIEF DESCRIPTION OF THE DRAWINGS

In the drawings that form part of a description of a preferred embodiment, and wherein like reference numbers refer to like structural elements.

DESCRIPTION OF THE PREFERRED EMBODIMENTS

Figure 1:
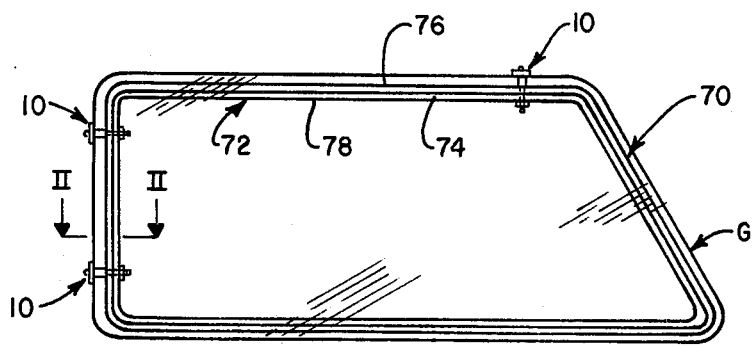
FIG. 1 is a plan view of an outline bending mold of the gravity-sag type provided with a pair of end stop members conforming to the present invention.
Figure 2:
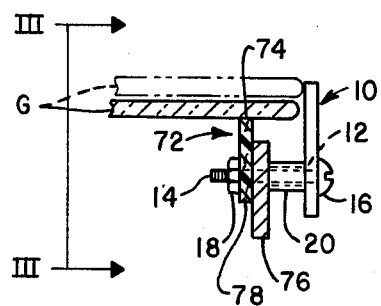
FIG. 2 is an enlarged section view taken along the lines II—II of FIG. 1.
Figure 3:
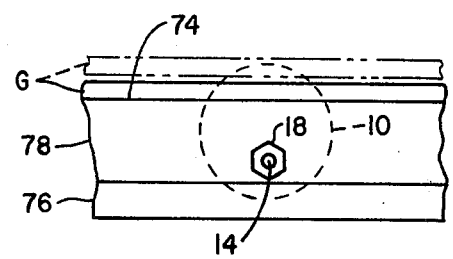
FIG. 3 is an enlarged end view taken along the lines III—III of FIG. 2.

One embodiment of the present invention illustrated in FIGS. 1 to 3 comprises a stop comprising a glass engaging member 10 of disc-like configuration approximately ⅛ inch (3.2 millimeters) thick and approximately 1⅝ inches (4 centimeters) in diameter provided with an aperture 12 along a diameter of the disc. The aperture has a diameter of approximately 3/16 inch (0.5 centimeters). The center of the aperture is approximately 25% from one end of the diameter and approximately 75% from the other end of the diameter. A threaded rod 14 is secured into the aperture and extends through the glass engaging member 10 of disc-like configuration.

The threaded rod 14 has an enlarged slotted head 16 at one end thereof and a lock nut 18 is threadedly engaged about the other end of the threaded rod 14. In this embodiment, particularly as depicted in detail in FIG. 2, a sleeve 20, of a length coordinated with the amount of glass sheet overhang desired beyond a mold or ring-like member 70 to which the glass engaging member is attached, surrounds the portion of the threaded rod 14 between the mold 70 and the inner side of the glass engaging member 10. A composite shaping rail 72 extending along the periphery of the mold or ring-like member 70 has an aperture that receives the threaded rod 14 and clamps the glass engaging member 10 in spaced relation to the outer facing wall of the composite shaping rail 72 between the sleeve 20 and the lock nit 18 so as to space the glass engaging member 10 a desired distance from the portion of the shaping surface defined by the upwardly facing edge defining a shaping surface 74 of the composite shaping rail 72.

The mold or ring-like member 70 is shaped in elevation and outline to conform to the shape desired for a glass sheet G that is supported thereon and conforms to the shape thereof. It is noted from FIG. 1 that the outline of the glass sheet extends slightly beyond the perimeter defined by the mold or ring-like member 70 so that the glass sheet G is supported with its edge surface engaging two or more glass engaging members 10 so as to insure that the glass sheet is in proper alignment and orientation relative to the ring-like member 70 on which it is mounted for shaping.

Referring to FIGS. 2 and 3, it is seen that a flat glass sheet (shown in phantom) is initially mounted above the upper edge defining the shaping surface 74. As the glass sheet bends, it sags into a position of engagement with the mold or ring-like member 70 depicted in full lines.

The composite shaping rail 72 for the mold or ring-like member 70 comprises an outer bar member 76 composed of stainless steel or other rigid metal and an inner glass engaging member 78 composed of a fiber glass reinforced epoxy resin or a phenolic resin reinforced with aramid fiber. A preferred glass contacting material useful for the glass engaging member according to the present invention is a material sold as ARK-2 ® by the Spalding Fiber Company, Inc. of Buffalo, N.Y. The phenol resin used is preferably polyphenyl formaldehyde. However, this invention is not limited to the aforesaid phenol resin.

The composite shaping rail 72 comprising the reinforcing metal rail 76 and the glass engaging rail 78 having its upwardly facing edge surface serving as a shaping surface 74 for the ring-like member or mold 70 is arranged in such a manner that the glass engaging rail 78 extends upwardly beyond its lower portion which is hugged by the reinforcing metal rail 76. The mold or ring-like member 70 is connected to a carriage (not shown) that supports the mold or ring-like member 70 for movement with a glass sheet G mounted thereon in a position of alignment defined by several glass edge engaging members.

The glass edge engaging member 10 of the preferred embodiment is eccentrically mounted with respect to the threaded rod 14 so that the amount of vertical wall provided by the glass edge engaging face of the glass edge engaging member 10 that faces the glass edge can be increased or decreased by rotation of the glass edge engaging member 10 relative to its eccentric mounting with respect to the threaded rod 14. Also, in cases where the stop becomes damaged, it is sometimes possible to avoid the need for replacing the damaged stop by a rotational adjustment of the damaged stop relative to the threaded rod to expose an undamaged portion of the stop symmetrical to the adjustment originally made.

The form of the invention shown and described in this disclosure represents an illustrative preferred embodiment. It is understood that various changes may be made such as supporting the glass edge engaging members from mold reinforcement members rather than directly from the shaping rail as in the described embodiment or using lock nuts instead of sleeve 20 to adjust the location of the stop relative to the outline mold, for example, without departing from the gist of the invention as defined in the claimed subject matter which follows.

I claim:

1. A stop adapted for attachment to a mold selected from outline molds of different outline configurations defining shapes of different depths of bend desired for glass sheets to be shaped to different patterns, said stop comprising a glass engaging member having a front surface positioned to engage an edge surface of a glass sheet to be mounted in engaging relation to said front surface when loaded onto a selected one of said outline molds for shaping, means to support said glass engaging member relative to a localized portion of an upwardly facing shaping surface defined by said selected outline mold, and said glass engaging member being mounted for rotation to said support means in eccentric relation thereto, whereby when said glass engaging member is rotated about said support means, the vertical dimension of said glass engaging member relative to said shaping surface is changed to correlate with the height of stop needed to engage an edge of a glass sheet to be bent to a shape conforming to that developed by said outline mold.

2. A stop as in claim 1, having said front surface composed of a ceramic material capable of withstanding the temperature to which said glass sheets are exposed during a bending operation.

3. A stop as in claim 1, wherein said support means comprises a rod threaded to adjust the position of said eccentrically mounted stop relative to said selected one of said outline molds in the axial direction of said rod.

4. A mold for shaping a heat-softened glass sheet comprising a shaping rail encompassing an outline conforming to and slightly smaller than the outline of a glass sheet to be shaped and a stop supported in spaced relation beyond the outline of said shaping rail, said stop comprising a glass engaging member having a front surface positioned to engage an edge surface of a glass sheet to be mounted in engaging relation to said front surface when loaded onto said outline mold for shaping, means to support said glass engaging member relative to a localized portion of an upwardly facing shaping surface defined by said shaping rail, and said glass engaging member being mounted for rotation to said support means in eccentric relation thereto, whereby when said glass engaging member is rotated about said support means, the vertical dimension of said glass engaging member of disc-like configuration relative to said shaping surface is changed to correlate with the height of stop needed to engage an edge of a glass sheet to be bent to a shape conforming to that developed by said shaping rail.

5. A mold as in claim 4, wherein said support means comprises a rod attached to said shaping rail below said upwardly facing shaping surface and extends outwardly therefrom to its connection to said eccentrically mounted glass engaging member.

6. A mold as in claim 4, wherein said rod is threaded to adjust the position of said stop relative to said shaping rail in the axial direction of said rod.

* * * * *